United States Patent Office 3,408,250
Patented Oct. 29, 1968

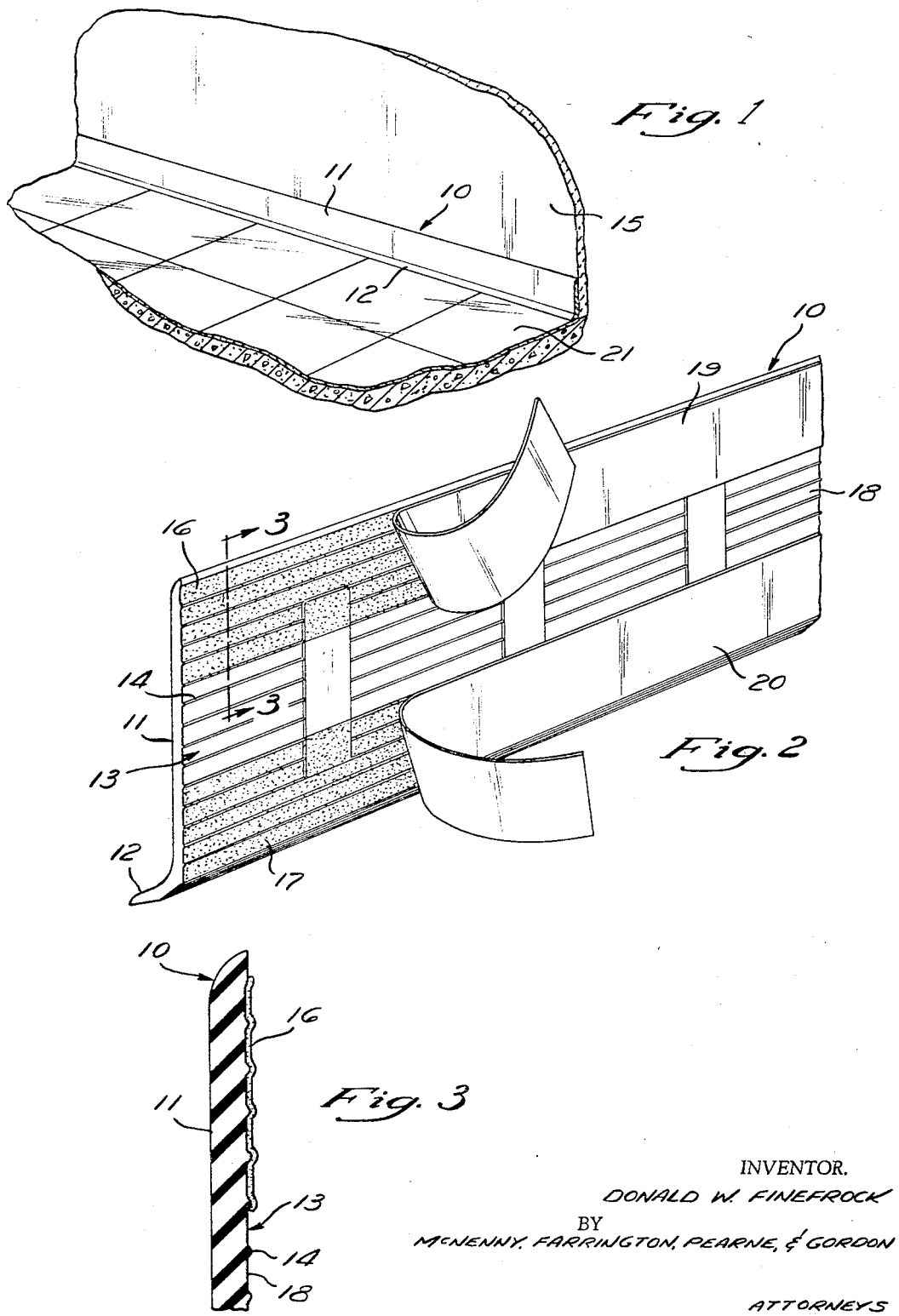

3,408,250
BASEBOARD MOLDING STRIP AND METHOD
OF INSTALLING SAME
Donald W. Finefrock, Middlefield, Ohio, assignor to The
Johnson Rubber Company, Middlefield, Ohio, a corporation of Ohio
Filed Mar. 16, 1967, Ser. No. 623,614
6 Claims. (Cl. 161—102)

ABSTRACT OF THE DISCLOSURE

A rubber cove or baseboard molding having an angularly extending foot to be resiliently pressed against the floor is provided with a pressure sensitive adhesive backing on its wall contacting surface. The backing is covered with release strips which are removed when the molding is applied to the intersection between the wall and the floor. The pressure sensitive adhesive prevents the molding from creeping upward on the wall from the reaction of the resilient foot against the floor.

Background of the invention

This invention relates to a baseboard molding or cove base and, more particularly, this invention relates to a baseboard having pressure sensitive adhesive on its wall contacting side.

Rubber or elastomeric baseboard molding is conventionally applied to a wall and its intersection with the floor by laying a length of molding on the floor and brushing a suitable paste such as linoleum paste onto the entire wall contacting surface of the molding. It is not possible to avoid some smearing and bleeding of the paste onto exposed surfaces of the wall, floor and molding, so that substantial time and labor are required to wipe up excess paste while it is still wet. When molding is installed in this manner, the installer must apply sufficient plaste to assure an adequate seal and thus excess paste is squeezed out above the molding when it is pressed into place. In addition, paste is smeared on the wall if the molding is initially misaligned when installed and the installer corrects the misalignment by sliding the molding in place.

The conventional method of applying such paste-backed molding includes the steps of first cutting a proper length of such molding and then applying linoleum paste or the like to the entire wall contacting surface of the molding. The installer then applies the molding to the intersection between the wall and the floor. Excess paste and smears on the exposed surfaces must then be cleaned up before the paste hardens and sets. Conventional molding strips include an integral floor engaging foot which extends outwardly along the bottom of the wall engaging portion of the molding. Preferably such molding strips should be installed so that the foot is flexed and resiliently pressed against the floor to form a proper seal with the floor and to force the foot to conform to any irregularities in the floor. Since the freshly applied paste is a fluid with little shear strength, the upward force exerted by the flexed foot portion of the molding strip causes the molding to creep upwardly on the wall until the force is relieved, so that it is not possible to obtain a tight seal with the floor.

Summary

The present invention overcomes many of these prior art problems by providing a molding base strip composed of rubber or other elastomeric material having pressure sensitive adhesive on its wall contacting surface. The pressure sensitive adhesive may cover the entire wall contacting surface of the molding strip or it may be arranged on the wall contacting surface of the molding only in areas which should be sealed, i.e. the top and bottom edge areas of the molding.

A protective matrix covers the pressure sensitive adhesive backing and may be stripped away as the molding strip is applied to the wall. This arrangement enables the installer to strip away lengths of the protective matrix as he applies the molding strip to the wall. Such application may be accomplished by pushing the molding strip downwardly relative to the floor to flex the foot of the strip relative to the wall contacting surface thereof. After the foot is flexed in this manner the pressure sensitive coated backing portion of the strip is applied to the wall. The shear strength of the pressure sensitive adhesive is sufficient to overcome any tendency of the flexed foot portion of the strip to push the wall contacting surface upwardly relative to the wall. Thus, the molding strip may be applied without any realignment of the foot portion relative to floor irregularities.

It is, therefore, a principal object of this invention to provide a molding strip which may be installed easily without applying a paste or glue to the wall contacting side of the strip.

It is a further object of this invention to provide a molding strip having areas of pressure sensitive adhesive on its wall contacting side of the strip only in those areas which must be securely joined to the wall.

It is a further object of this invention to provide a molding strip having irregularities on its wall contacting side which are covered by pressure sensitive adhesive so that the irregularities provide points of localized pressure when the molding strip is pressed in place to securely fasten the strip to the wall.

It is a further object of this invention to provide a molding strip having a wall contacting surface and a floor engaging foot portion which may be flexed relative to the wall contacting surface. The wall contacting surface is provided with a thin layer of pressure sensitive adhesive. Such adhesive has a shear strength which is sufficient to resist the tendency of the flexed foot portion of the strip to move the wall engaging surface of the strip upwardly relative to the wall, so that it remains resiliently pressed against the floor.

These and other objects of the invention will become apparent from the following detailed description and from the accompanying drawings.

Brief description of the drawings

FIGURE 1 is a fragmentary perspective view of the intersection between a wall and a floor, showing a molding strip or cove base applied to that intersection;

FIGURE 2 is a fragmentary perspective view of the wall contacting side of the molding strip illustrated in FIGURE 1, showing the areas of pressure sensitive adhesive on that strip and further showing portions of protective matrices stripped away from the pressure sensitive adhesive; and, FIGURE 3 is a fragmentary cross sectional view, the plane of the section being indicated by the line 3—3 in FIGURE 2.

Description of the preferred embodiment

Referring now to the drawings, a cove base or baseboard strip 10 is illustrated. The strip 10 may comprise an extruded length of rubber or other elastomeric material. The strip 10 comprises a wall contacting portion 11 and an integral floor engaging foot portion 12 which is blended into the wall contacting portion 11 and extends outwardly from the portion 11 at an obtuse angle. The portion 11 has a wall engaging rear surface 13 which is provided with a multiplicity of irregularities or ribs 14. As will hereinafter become apparent, the ribs 14 provide a multiplicity of pressure points which assure an effective seal between the surface 13 and a wall 15.

In the preferred embodiment, upper and lower pressure sensitive adhesive strips 16 and 17, respectively, are provided on the surface 13. The strips 16 and 17 are separated by a non-adhesive portion 18 so that the adhesive is provided only in those areas of the molding strip which must be securely joined to the wall.

The adhesive strips 16 and 17 are respectively covered by conventional release strips or matrices 19 and 20 which may be peeled from the adhesive strips 16 and 17 during installation in a manner which will now be explained.

The baseboard or molding strip 10 may be applied to the right angled intersection between the wall 15 and a floor 21 by peeling off a few feet of the matrices 19 and 20 from a portion of the strip 10. The installer then pushes that portion of the molding strip 10 downwardly against the floor adjacent the wall so that the foot portion 12 is flexed relative to the wall contacting portion of the strip 10. With the foot 12 in its flexed condition, the wall contacting portion of the strip is pressed against the wall. The installer then continues to strip away the protective matrices 19 and 20 and applies the remaining portions of the molding strip 10 in the foregoing manner.

Conventional pressure sensitive adhesive available on the market has a sufficient shear strength to overcome any tendency of the foot portion 12 to slide the wall contacting portion of the strip 10 upwardly. Thus the foot portion 12 conforms to any irregularities in the floor and provides a tight, even seal on the floor.

As the strips 16 and 17 are pressed against the wall, the ribs 14 function as areas of localized pressure to insure a tight seal between the wall contacting surface 13 and the wall 15 and further resist any tendency of the portion 13 to slide upwardly relative to the wall 15.

The invention is not restricted to the slavish imitation of each and every detail set forth above. Obviously, devices may be provided which change, eliminate, or add certain specific details without departing from the scope of the invention.

What is claimd is:

1. A baseboard molding strip of elastomeric material having a wall contacting surface and an integral foot portion extending angularly outward along the bottom of the strip at an obtuse angle with respect to said wall contacting surface, said foot portion being flexed within its elastic limit upwardly relative to the wall contacting surface when the molding strip is applied to the right-angled junction of a wall and a floor and exerting a downward pressure on the floor when it is so flexed by its tendency to return to its unflexed angularly extending position, and a pressure sensitive adhesive backing material on said wall contacting surface adapted to seal against the wall and hold said foot portion resiliently pressed against the floor.

2. A baseboard molding strip as set forth in claim 1 wherein said pressure sensitive adhesive backing material comprises top and bottom areas of pressure sensitive backing material which are separated by an intermediate non-adhesive area.

3. An assembly comprising a molding strip applied to the right-angled intersection between a wall and a floor, said assembly including a molding strip having a wall contacting portion and an integral foot portion extending outwardly along the bottom of the strip, said wall contacting portion being adhesively secured to the wall by a pressure sensitive adhesive backing material and said foot portion being flexed within its elastic limit against said floor and exerting an upward force on the wall contacting portion of the strip, said pressure sensitive adhesive resisting said force and holding said foot portion resiliently pressed against the floor.

4. A baseboard molding strip of elastomeric material having a wall contacting surface and an integral foot portion extending angularly outward along the bottom of the strip, said foot portion being adapted to be flexed within its elastic limit upwardly relative to the wall contacting surface when the molding strip is applied to the right-angled junction of a wall and a floor, a pressure sensitive adhesive backing material on said wall contacting surface adapted to seal against the wall and hold said foot portion resiliently pressed against the floor, said pressure sensitive adhesive backing material comprising top and bottom areas of pressure sensitive adhesive backing material which are separated by an intermediate non-adhesive area, at least the wall contacting surface covered by the pressure sensitive adhesive backing material having a multiplicity of ribs which provide areas of localized pressure when the strip is applied to a wall to ensure a tight seal between the wall contacting surface of the molding strip and the wall.

5. A method of installing a baseboard molding strip having a wall contacting surface and an integral foot extending outwardly along the bottom of said strip comprising the steps of providing a pressure sensitive adhesive coating on the wall contacting surface of said molding strip, flexing said foot portion against the floor and, while said foot is flexed, applying the adhesively coated wall contacting portion to said wall.

6. A method of installing a baseboard molding strip having a wall contacting surface and an integral foot portion extending outwardly along the bottom of said strip, having a pressure sensitive adhesive backing material comprising top and bottom areas of pressure sensitive backing material which are separated by an intermediate non-adhesive area, and having a multiplicity of ribs in at least the wall contacting surface covered by the pressure sensitive adhesive backing material, comprising the steps of flexing said foot portion against the floor and, while said foot is flexed, applying the adhesively coated wall contacting portion to said wall.

References Cited

UNITED STATES PATENTS

| | | | |
|---|---|---|---|
| 1,409,767 | 3/1922 | Perry | 161—123 |
| 1,440,358 | 12/1922 | Whetstone | 161—123 |
| 1,702,530 | 2/1929 | Williams | 161—146 X |
| 1,707,515 | 4/1929 | Evans | 161—147 X |
| 1,820,047 | 8/1931 | Burkart | 161—146 X |
| 2,313,990 | 3/1943 | Crandell | 52—417 |
| 3,091,898 | 6/1963 | Fasold et al. | 161—123 X |
| 3,200,547 | 8/1965 | Johnson | 52—288 |

HAROLD ANSHER, *Primary Examiner.*